United States Patent [19]

White

[11] 4,418,576

[45] Dec. 6, 1983

[54] APPARATUS AND METHOD FOR AUTOMATICALLY REPLENISHING LIQUID AND MEASURING THE RATE OF EVAPORATION OF A LIQUID

[75] Inventor: Allan E. White, Hightstown, N.J.

[73] Assignee: RCA Corporation, New York, N.Y.

[21] Appl. No.: 505,125

[22] Filed: Jun. 21, 1983

Related U.S. Application Data

[63] Continuation of Ser. No. 279,739, Jul. 2, 1981.

[51] Int. Cl.³ .................... G01N 33/18; G01N 25/00
[52] U.S. Cl. .................................................. 73/61.3
[58] Field of Search ......................... 73/61.3, 53, 293; 210/509

[56] References Cited

U.S. PATENT DOCUMENTS

| | | | |
|---|---|---|---|
| 2,692,220 | 10/1954 | Labino | 210/509 X |
| 3,636,360 | 1/1972 | Oishi et al. | 73/293 X |
| 3,666,419 | 5/1972 | Cahour | 73/53 X |
| 4,324,132 | 4/1982 | Williams | 73/61.3 |

FOREIGN PATENT DOCUMENTS

| | | | |
|---|---|---|---|
| 2464474 | 3/1981 | France | 73/53 |
| 381027 | 7/1973 | U.S.S.R. | 73/61.3 |

Primary Examiner—Gerald Goldberg
Assistant Examiner—Tom Noland
Attorney, Agent, or Firm—Birgit E. Morris; Donald S. Cohen; Joseph D. Lazar

[57] ABSTRACT

An evaporimeter formed of a capillary tube hydraulically coupled to a sheet of filter paper to form a capillary system establishing hydraulic continuity of liquid between the tube and the surface of the filter paper is automatically replenished with the liquid as the liquid evaporates. The rate of evaporation from the surface of the filter paper of a liquid, such as water, in the tube and filter paper is automatically measured using a photoelectric sensor as the air-liquid interface moves upwardly in the tube as the water is drawn from the tube to replace the evaporated water.

13 Claims, 3 Drawing Figures

& nbsp;
APPARATUS AND METHOD FOR AUTOMATICALLY REPLENISHING LIQUID AND MEASURING THE RATE OF EVAPORATION OF A LIQUID This is a continuation of application Ser. No. 279,739, filed July 2, 1981.

This invention relates to an apparatus for measuring the rate of evaporation of a liquid, particularly water.

BACKGROUND OF THE INVENTION

The rate of evaporation, especially for water, is a quantity useful in many applications. Not only is the rate of evaporation of water useful in meteorology, but also in the control of manufacturing and storage where moisture sensitive materials are handled. Furthermore, in agriculture especially where irrigation is practiced, the control of water resources is significantly important. The knowledge of the evaporation rate is an important factor in such agricultural practices. Moreover, knowledge of the evaporation rates in libraries and museums is important for the preservation of books and antiques.

An evaporimeter for measuring the evaporation rate of a liquid is described in U.S. patent application Ser. No. 139,738, filed Apr. 14, 1980, entitled "APPARATUS AND METHOD FOR MEASURING THE RATE OF EVAPORATION OF A LIQUID" by R. Williams, now U.S. Pat. No. 4,324,132, issued Apr. 13, 1982. The apparatus of the evaporimeter operates on the principle of hydraulic continuity using capillary action in a capillary system formed of a capillary tube carrying an evaporable liquid, such as water, to a large evaporation surface of fibrous material. Liquid evaporated from the surface of the liquid is replenished by the liquid in the tube. The rate of movement of the tube liquid is a measure of the evaporation rate.

SUMMARY OF THE INVENTION

The present invention provides apparatus and the method for measuring the rate of evaporation by a liquid reservoir supply in liquid to the capillary tube and replenishing the liquid automatically as the liquid is evaporated from the evaporation surface.

A feature of the invention provides for automatically measuring the evaporation rate as the liquid is replenished.

DETAILED DESCRIPTION OF THE PREFERRED EMBODIMENTS

Figure 1:
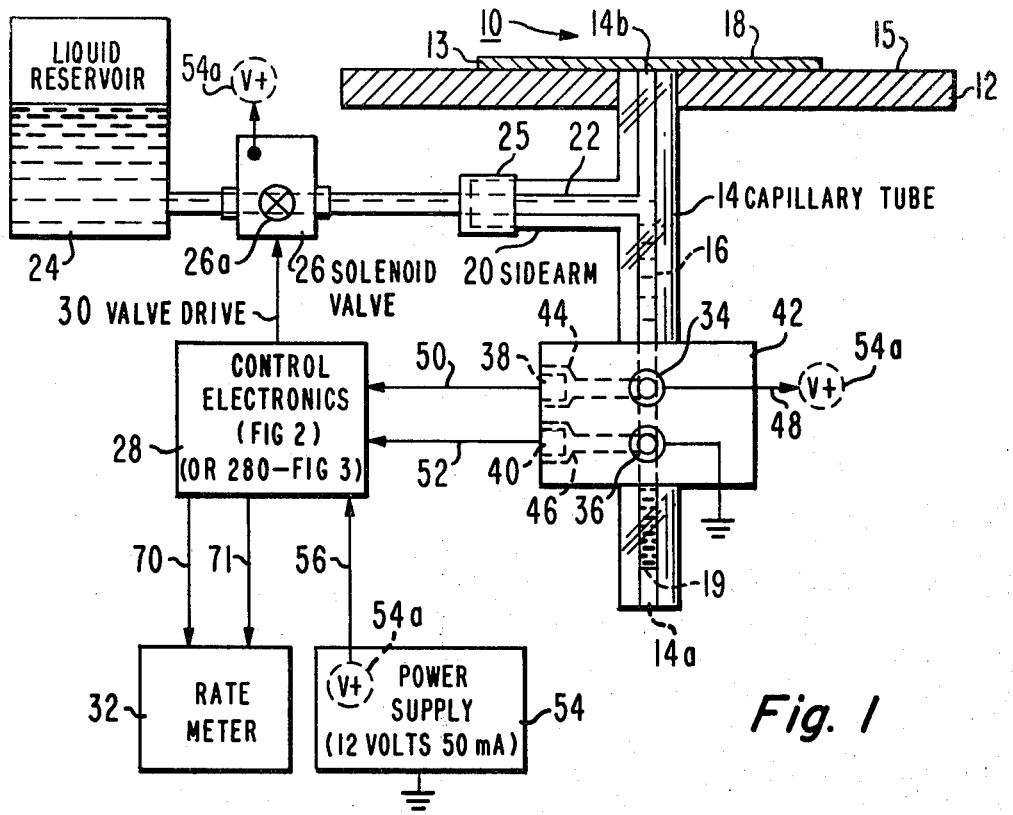
FIG. 1 is a schematic of the apparatus embodying a preferred form of the invention.

FIG. 1 illustrates the evaporimeter 10 modified according to the invention to replenish liquid automatically as it evaporates and to measure the rate of evaporation. The evaporimeter 10 and its principle of operation is described in the aforementioned patent application, now U.S. Pat. No. 4,324,132, issued Apr. 13, 1982 of R. Williams, which application and patent is hereby incorporated by reference.

The evaporimeter 10, as shown in FIG. 1, is formed of a plate 12 joined to a thick-walled capillary tube 14 having a passageway 16 with an open end 14a remote from the plate 12 and an open end 14b terminating at the surface of the end wall of the tube 14 which is contiguous and coplanar with the surface 15 of the plate 12. The capillary passageway 16 thus extends from the upper surface 15 to the open end 14a of the tube 14. The tube 14 and the plate 12 are preferably made of glass or quartz and the tube 14 is joined integrally with the glass plate 12 as by fusing a portion of the tube into an aperture in the glass plate. Plate 12 is about 10 cm sq. and the inside diameter of the capillary tube passageway 16 is about 1 mm. The ratio of the areas of the plate 12 to the passageway 16 is about 10,000 to one (i.e. $10^4$) the significance of which to be explained.

The term evaporimeter as used in here refers to an apparatus or instrument for measuring the rate of evaporation of a liquid. In the art, the term atmometer is used to refer to an instrument for measuring the rate of water evaporation. At times, such devices are also called evaporation gauges. Nevertheless, this invention provides a means for measuring the rate of evaporation of a liquid and may be termed, for convenience, an evaporimeter.

It should be understood that the rate of evaporation (R) of a liquid depends upon and influenced by the relative humidity, wind velocity and solar radiation at the measuring site in a complex relationship. In the practice of this invention the evaporation rate is measured directly at the site without distinguishing what effect any one or more of these influencing factors has on that evaporation rate. Accordingly, the measured value of evaporation rate will change as any or all of the influencing factors change.

The evaporimeter 10 is arranged initially for use by applying to the plate surface 15 a liquid-saturable fibrous material such as filter paper 13 of about 0.1 mm thickness and having an area that is not greater than the surface area of plate 12. When liquid, such as water, is filled in the capillary tube within the passageway 16 and the filter paper 13 is saturated with water, there is established hydraulic continuity between the liquid in the capillary passageway 16 and the filter paper 13. The principle of the invention depends upon hydraulic continuity being maintained in what may be termed a capillary system comprising the capillary tube 14 and the fibrous material of the filter paper 13.

Hydraulic continuity is provided from capillary action in a capillary system. As known, a manifestation of surface tension by which a portion of a surface of a liquid coming in contact with a solid is either elevated or depressed depends upon the adhesion or coadhesive properties of the liquid relative to the material of the type that is used to form the walls of a capillary tube passageway. The flow of liquid in the capillary passageway depends upon the pressure of the environment to which the capillary passageway is exposed, the length of the column of liquid, the surface tension, the capillary radius and the viscosity of the liquid. The relationship of the flow rate through a capillary tube passageway is similar to and applicable to a fibrous material such as filter paper in which the adjacent fibers of the filter paper serve as the walls for a passageway exhibiting the capillary action. See R. L. Peek and D. A. McLean, *Industrial and Engineering Chemistry*, Vol. 6, p. 85, (1934) for a discussion of capillary flow in filter paper.

The filter paper 13, when exposed to the ambient and saturated with a liquid, provides a large evaporation surface 18. As the liquid evaporates from the filter paper 13, capillary action replenishes the liquid in the filter paper with the liquid drawn from the capillary tube 14. The column of liquid in the capillary tube is under tension and has a negative pressure with respect to the ambient atmosphere. As the liquid rises upwardly from the open end 14a exposed to the ambient air, the capillary front, or the air liquid interface 19, defines the lower boundary of liquid available in the capillary system. It is this liquid that is needed to maintain the evaporation surface, namely the filter paper 13, with sufficient liquid.

According to the present invention, the evaporimeter 10 is modified with means to replenish the liquid into the capillary tube 16 as it is depleted in the evaporation process. A sidearm 20, comprising a capillary tube with a capillary passageway 22, is attached to the capillary tube 14 such that the passageway 22 is in communication with the passageway 16. The respective diameters of the tubes 20 and 14 and their capillaries 22 and 16 are the same dimension. A conduit is connected to a reservoir 24 of the liquid used in the evaporimeter. A suitable coupling member 25 having a liquid seal is provided to make easy connection of the conduit to the evaporimeter 10 provided with the sidearm 20. A solenoid valve 26, responsive to control signals from control electronics 28 via the path 30 functions to control the flow of liquid from the reservoir 24 into the capillary tube 16 via the sidearm capillary 22. Control electronics 28 is formed of suitable control logic and computation logic responsive to the sensing means to be described to control the operation of the solenoid valve 26 and to provide signals for rate meter 32, to be further described.

Means are provided to sense the passage of the air liquid interface 19 upwardly in the capillary 16 as the evaporation process occurs. The sensing means comprises in one embodiment two light emitting diodes (LED's) 34 and 36 positioned to pass light generated therefrom through the capillary passage 16. A pair of photodetectors 38 and 40 are positioned to receive light from the LED's 34 and 36, respectively, that may pass through the capillary 16. The light from the LED's 34 and 36 are such as to pass readily through the capillary 16 without the presence of a liquid and be sensed by the photodetectors 38 and 40. However, with liquid in the capillary tube, there is sufficient absorption of the light by the liquid as to prevent the light to reach the photodetectors.

In the form illustrated by this embodiment, the LED's and photodetectors are mounted in a block 42, suitably of aluminum, since it is easily machined, having an aperture to receive the capillary tube 14. Recesses are provided to receive the LED's 34 and 36 with the associate wiring needed for operation and the photodetectors 38 and 40, as shown. Optical passageways 44 and 46 are provided in the block 42 to pass light from the respective LED's 34 and 36 to the photodetectors in such a way as to minimize the light level changes that may exist in the ambient which would otherwise affect the operation of the level detectors. Accordingly, the passageways 44 and 46 are arranged to provide an aperture of the minimum diameter to pass light only from the LED's. The LED's are energized by the control electronics 28 via bus 48. Light detected by sensors 38 and 40 develop an electrical signal which is coupled to the control electronics 28 via paths 50 and 52.

While the relative orientation of the LED's to their associated detectors may be arranged in any suitable manner, the preferred arrangement of the LED's to their detectors is that their optical axes are respectively perpendicular to each other. The reason for this is that when the capillary tube 16 is filled with liquid, the light from an LED will pass along its optical axis with an action comparable to a cylindrical lens and with no reflection from the inner wall of the capillary tube since the index of refraction of the liquid, such as water, is substantially the same as the index of refraction of quartz glass, the preferred form of the tube 14. However, when the capillary 16 is filled with air, having a different index of refraction than quartz, light passing from the LED will be reflected by the inner walls of the quartz tube. It has been determined experimentally that the maximum reflection with air in the tube 16 is at about 90°. Accordingly, in the preferred form of the invention, the photodetectors 38 and 40 are positioned along this 90° reflection angle such that the optical axis of the axes of the LED's 34 and 36 are normal or perpendicular to the optical axis of the photodetectors 38 and 40.

A suitable LED is a Hewlett-Packard type HLMP-1300, typically red in color, although any color may be used. A suitable photodetector is a Fairchild type FPT 110B. A suitable solenoid valve is a Reedair type VRM-2 by Syntec, Inc.

The control electronics 28 is suitably powered by a power supply 54, preferably a battery that is rechargeable. The power supply for the control electronics of the embodiment being described provides 12 volts at about 50 milliamperes at terminal 54a. If desired, the apparatus can be powered from a solar cell rechargeable storage battery of the type well known in the art. Accordingly, the sensor is suitable for a large variety of applications requiring remote, or continuous or both remote or continuous sensing of evaporation rates of a liquid.

The rate meter 32 is arranged to receive timing signals from the control electronics 28 to calculate the rate of evaporation. If desired, a recorder or other suitable storage apparatus can be provided to store the evaporation rate information from the control electronics for later readout as required.

Figure 2:
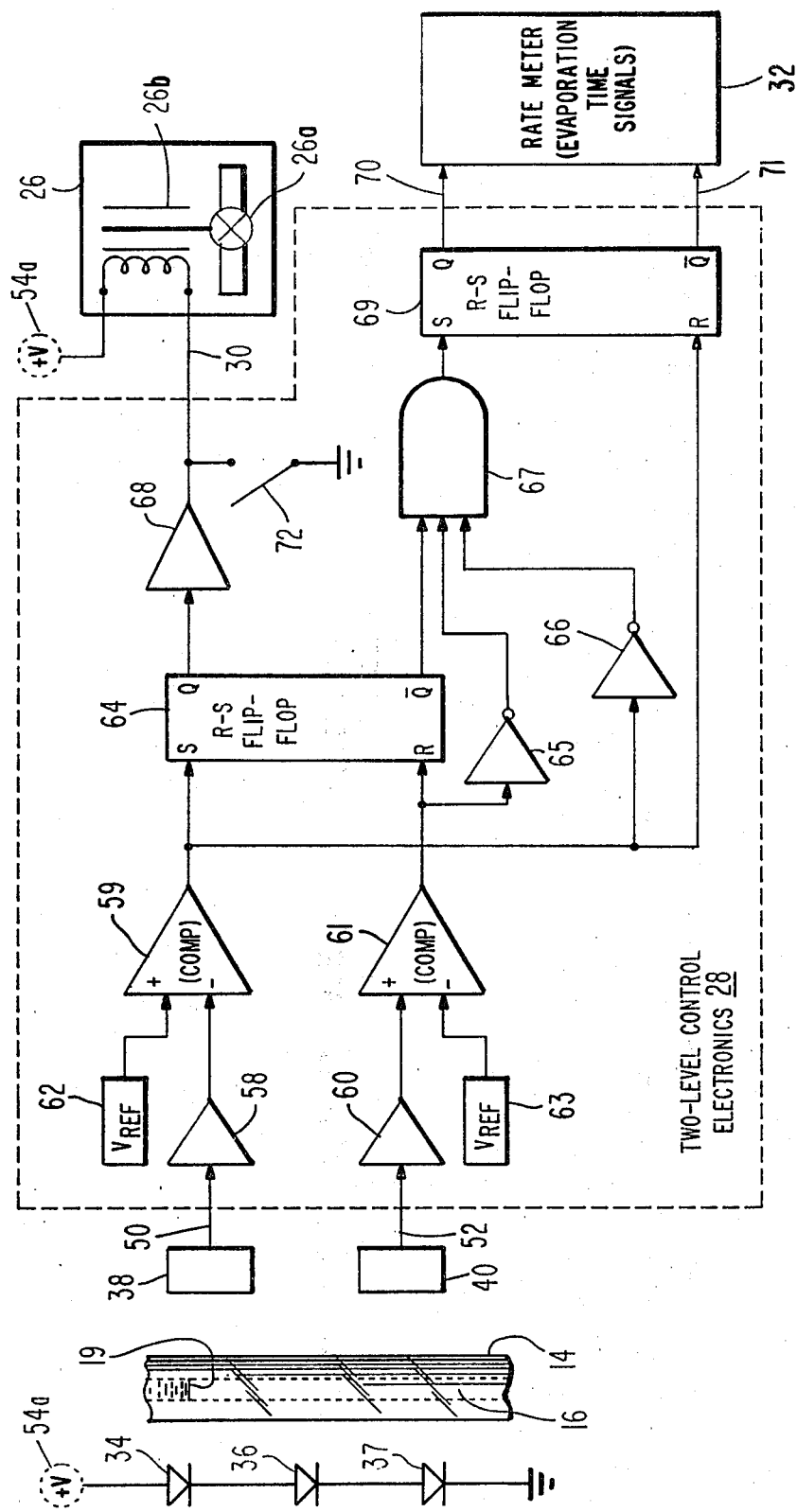
FIG. 2 is a block schematic of one form of the control electronics responding to two level sensors.
Figure 2:
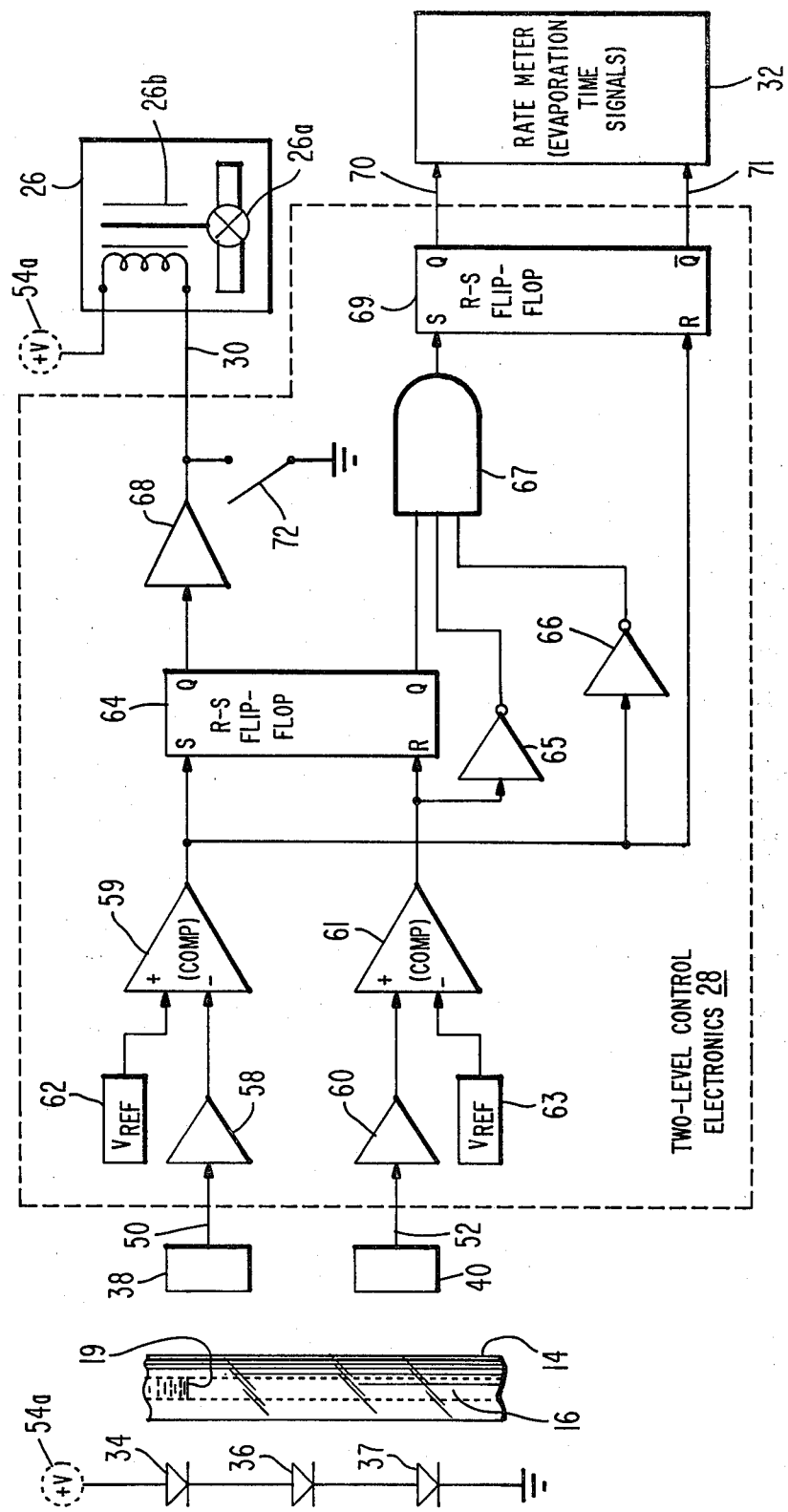

FIG. 2 is a suitable circuit for control electronics 28 operating in a two level sensor arrangement as shown in FIG. 1. LED's 34 and 36 are connected in series preferably with a current regulator LED 37 between +V via terminal 54a of power supply 54 and ground. A suitable current regulator LED 37 is a Litronix RLC-201. This regulator serves to maintain a substantially constant current in the circuit between battery supply 54a and ground. Accordingly, the current through each of LED's 34 and 36 is constant and the emitted light therefrom is constant even with fluctuations in the supply voltage. Moreover, LED 37 can serve as a visual monitor, such as on a control panel, of the operating condition of the LED's 34 and 36.

Photodetector 38 is coupled via path 50 to a preamplifier 58 which in turn is coupled to the negative terminal of a comparator 59. Photodetector 40 is coupled via path 52 to a preamplifier 60 which in turn is coupled to the positive input terminal of a comparator 61. The positive terminal of comparator 59 is connected to a variable reference voltage 62 whereas the comparator 61 is connected at its negative terminal to a variable reference voltage 63.

Comparator 59 provides an output responsive to a signal from photodetector 38 depending upon the adjustment of the reference voltage 62. Similarly, the comparator 61 is adjusted to be responsive to photodetector 40 at a predetermined reference level, depending upon the adjustment of reference voltage 63. The output of comparator 59 is coupled to the set (S) input terminal of an R-S Flip-Flop (FF) 64 and also connected to the reset (R) terminal of an R-S Flip-Flop (FF) 69. In addition, the output of comparator 59 is connected to the input of an inverter 66, whose output in turn is connected to one terminal of three input terminal AND gate 67.

The output of comparator 61 is coupled to the reset (R) input terminal of FF 64 as well as the input to inverter 65, which in turn is connected to the second input terminal of AND gate 67. The inverted output ($\bar{Q}$) of FF 64 is coupled to the third input of AND gate 67, whose ANDed output is coupled to the set (S) input terminal of FF 69. The Q terminal of FF 64 is connected to the input of solenoid driver amplifier 68 which is coupled to energize the solenoid coil 26b of the solenoid valve 26 via the V+ terminal 54a of the power supply 54. Solenoid coil 26b, when energized, causes the valve 26a to be opened. The output (Q) of FF 69 is coupled to the rate meter 32 via path 70 while the inverted output ($\bar{Q}$) of the FF 69 is connected to the rate meter 32 via path 71.

The operation of the circuit of FIG. 2 will be described starting with a condition in which the tube 14 is to be refilled with water after the air-water interface 19 has risen to a point above the upper detector 38. Moreover, the apparatus in this condition will have had already cycled at least once from a condition in which the water had been prior to that completely filled in the tube. This was done, for example, by operating switch 72 to open the solenoid valve 26a to thereby fill water into the system. The system is purged of air bubbles by the process of saturating the filter paper 13 with water.

In the assumed initial condition, valve 26a is open, allowing water to enter via arm 20 into tube 14 to cause thereby interface 19 to drop downwardly toward the tube portion at detector 38. At the time the interface 19 passed detector 38 downwardly allowing light to be interrupted, the condition of the circuit was as follows: Solenoid 26 was open allowing water to flow to the tube 14; FF 64 is in its SET state wherein the Q output is high; FF 69 is in its RESET state wherein the Q output is low and $\bar{Q}$ is high. The Q signal on path 70 is used by the rate meter 32 to calculate the evaporation rate based on the movement of the interface 19 between the lower detector 40 and the upper detector 38. Accordingly, during the water refill operation no timing signals are used.

As interface 19 drops and interrupts the beam from LED 34 to detector 38, no circuit conditions change since the FF 64 is in the SET state. As the water continues to flow into the tube, interface 19 drops and breaks the beam to detector 40, causing thereby the RESET input to FF 64 to go high, closing the solenoid valve 26a, thereby stopping the flow of water into tube 14.

At this state the tube 14 is filled with water adequate to maintain the water needed and the apparatus is ready to start the evaporation rate measuring cycle.

As the water is evaporated from the filter paper 13, causing interface 19 to rise upwardly in the tube, light is allowed to pass from lower LED 36 to detector 40. The circuit operates to keep FF 64 in its RESET state, and to cause FF 69 to be SET, since the output of comparator 61 is also low. FF 69, in its SET state, starts timing signals by causing a high output on path 70 to the rate meter 32. As the interface 19 rises to the level at which a light beam passes from LED 34 to detector 38 the timing cycle is terminated by resetting FF 69. This causes the signal on the Q output, path 70, to return to low. Coincidentally, the $\bar{Q}$ signal on path 71 can be used if the rate meter is of the type arranged to use such a signal to determine the evaporation rate. At this time, the automatic water refill cycle is started by causing the solenoid valve 26a to be opened via the FF 64 being SET causing the solenoid 26b to be energized and opened. The cycle is then repeated as described hereinabove. Refer back to FIG. 1 for an overall description of the apparatus. Before the apparatus operates in a completely automatic mode, the capillary tube is filled with water, such that the filter paper 18 is saturated and the water is completely filled in the capillary passageway 16 so that the air liquid interface 19 is essentially at the open end 14a. Moreover, sufficient water is added to the evaporimeter 10 to completely fill the passageway 22 of sidearm 20 and the conduit 23. The water in reservoir 24 will be blocked from the system by the solenoid valve 26 in a normally closed position. There should be no air pockets in the system from the water reservoir 24 through the pipes 23 and 22 and the capillary passageway 16. This is essential to preserve the hydraulic continuity which maintains the capillary action.

In order to assure that there is no breakage or interruption of the capillary action, the sensor block 42 carrying the sensing electronics is spaced below the side arm 22 sufficiently so that the interface 19 does not rise up to the reservoir supply line at the level of capillary 22 before the automatic replenishing of the water occurs, as will now be described.

In overall operation, as the water evaporates from the filter paper 13, the air liquid interface 19 will rise upwardly in the capillary tube 16, eventually reaching the lower level photodetector 40. When the interface 19 passes this portion of the tube, light from the lower LED 36 will be free to pass through the passageway 46 for sensing by the photodetector 40. Detector 40, responsive to the light beam, will generate a signal via path 52 which is received by control electronics 28 as described above in relation to FIG. 2, to start the timing sequence to determine the evaporation rate and to initiate the liquid replenishing cycle.

The interface 19 continues to rise at a rate proportional to the evaporation rate in the ambient, until the upper level detector 38 is reached. Detector 38, responsive to a light beam signal from upper LED 34, effected by the absence of liquid in that portion of the tube 16, provides a signal that terminates the timing sequence via path 50 to electronics 28. Control electronics 28 provides a control signal via path 30 to solenoid 26 to open the solenoid valve. Liquid passes thereby from the liquid reservoir 24 into the capillary 16, causing the liquid to move the interface 19 downwardly until the lower detector 40 is reached. At this point, the circuitry of the control electronics 28 is reset, causing the solenoid valve 26 to be closed, thereby terminating the passage of replenishing liquid into the capillary tube 16. The control logic of electronics 28 can be arranged such that the capillary 16 is slightly overfilled by an amount more than is defined by the lower limit of the lower level detector 46. Accordingly, the air-water interface 19 ends up slightly below the lower level detector 46. This additional overfilling is achieved by suitably delaying the action of closing the solenoid valve 26 following the receipt of the level indicator signal from a level detector 44. This provides a small delay between the replenishing cycle and the start of the timing cycle, giving a well-defined starting point for the timing cycle.

Figure 3:
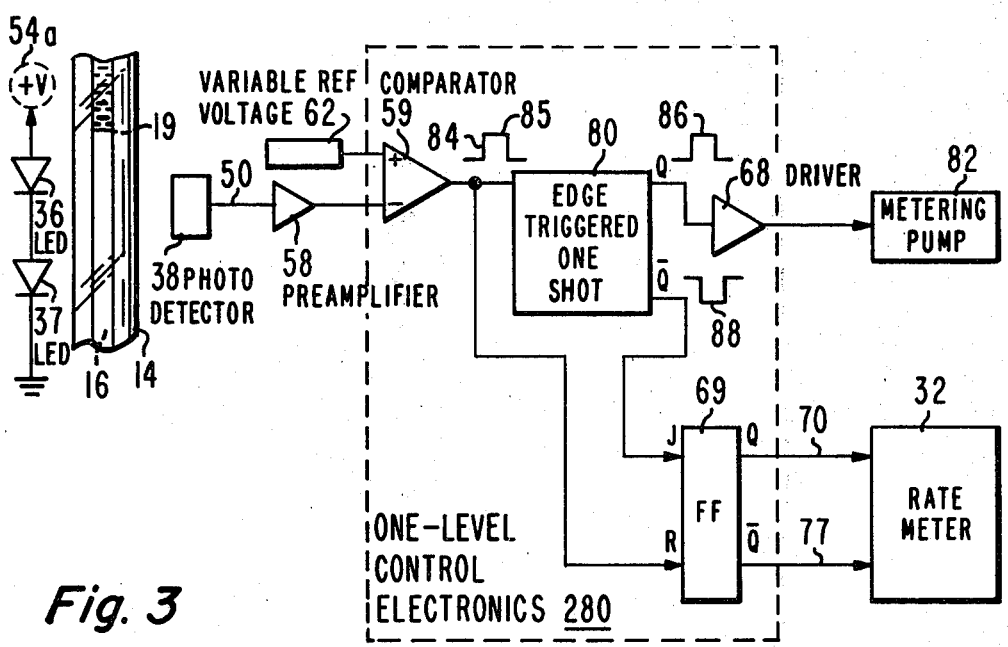
FIG. 3 is a block schematic of another form of the control electronics responding to one level sensor.

Referring now to FIG. 3 for an arrangement of control electronics 280 which is a modification of control electronics 28 detailed in FIG. 2. In the arrangement of control electronics 280 the apparatus is arranged to provide automatic refilling of the capillary tube and calculation of the evaporation rate automatically using only a single level sensor. In the arrangement of FIG. 3 the components that are the same as those shown in FIG. 2 are indicated with the same reference numeral. Only one LED, for example LED 36 is connected in series with the constant current LED 37 between voltage source 54a and ground. The LED 36 is positioned preferably at a 90° angle relative to the associated photodetector 38 between which is positioned capillary tube 14. The circuit is similar to FIG. 1 except that only one LED and photodetector is used. The output of comparator 59 is connected in this arrangement directly to FF69 and to the input to an edge triggered one shot 80. One shot 80 is suitably an RCA CD-4047 arranged to be adjusted for a preset time interval, for example, one second, to meet the operation time for the metering pump 82. One shot 80 responds only to the leading edge 84 of the signal 85 and generates a Q signal output 86. The Q output 86 of one shot 80 is coupled to the input of amplifier 68 whose output in turn drives a metering pump 82. Metering pump 82 in this embodiment replaces the solenoid fill valve 26. Pump 82 is of conventional form of the type that will allow a predetermined quantity of liquid, for example, 100 microliters to be passed from the liquid reservoir 24 into the tube 14 via the capillary side arm 20. A suitable metering pump is manufactured by the Hamilton Syringe Company, Reno, Nev. as their Precision Liquid Dispenser II. This pump provides liquid in the range of 1 microliter to 20 microliters per shot. Thus, with this arrangement the metering pump obviates the need of opening and closing signals for a metering valve.

The $\overline{Q}$ output 88 of one shot 80 is coupled to the SET (S) input of FF 69. The outputs of FF 69 are coupled to the rate meter 32 as for FIG. 2.

The circuit 280 operates to respond to the passage of the interface 19 to interrupt or pass the beam from LED 36 indicative of movement of the water in the tube. As the interface 19 moves upwardly past the LED, the circuit operates to cause the metering pump 82 to operate and thereby refill the tube 14 with a predetermined amount of water sufficient at least to cause the interface to drop below the level of LED 36. The circuit is then ready to respond to the interface 19 moving upwardly past the LED 36 to cause the refilling operation to occur.

The calculation of the evaporation rate is determined by the start of the cycle when the interface starts moving upwardly after the refill cycle to establish the beam and again operate the one shot 80. At this point, FF 69 is RESET, causing the Q signal on path 70 to be low. At the end of the one shot cycle, the $\overline{Q}$ signal 88 sets FF 69 causing Q on path 70 to go high. The period of time between the high and low of the Q signal is used to determine the evaporation rate.

Since the inner area of the capillary tube 16 is about $10^{-4}$ times the total area of the filter paper from which evaporation is taking place, the liquid moves upward in the capillary tube at a rate that is $10^4$ times the evaporation rate. For example, a large water surface that evaporates 3 mm of water a day can be compared with the motion of the interface 19 according to the evaporimeter 10 of the present invention. For the same linear rate of evaporation, the interface 19 moves upwardly 10 cm. in about six minutes. Such a rate of movement (R) enables one to measure evaporation rates with good accuracy in a few minutes rather than in a day as done in typical prior art systems.

The evaporation rate (R) is related to the velocity v of the upward motion of the interface 19, the area A of the filter paper 13, and the area a of the capillary tube 16 by the following relationship:

$$R = v(a/A) \tag{1}$$

Using this relationship and observed values of v, a, and A, there is good agreement between the evaporation rate R measured for water using this method and that measured by direct observation of evaporation from a shallow pan in the same environment.

It will be appreciated that the value v in equation (1) is calculated from the spacing between the two sensor elements (detectors 38 and 40) and the time (t) it takes for the interface 19 to pass therebetween. The time (t) is the time period during which the Q output of FF 69 is high.

For the purposes of determining the evaporation rate of water, it is preferred that distilled water be used with the understanding that other liquids can be used. For example, salt water can be used in the practice of the invention with the understanding that the evaporation rate from the paper 13 is expected to be lower because the vapor pressure is lower for salt water. However, with the use of salt water or, for that matter, any liquid that has a contaminant in it will cause residue in the filter paper, requiring more frequent replacement of the filter paper.

In a preferred form of the invention, the filter paper is about 0.2 mm thick and the diameter of the paper is 9 cm. The diameter of the capillary tube is 1.0 mm. A suitable filter paper is manufactured as the well known Whatman No. 4 qualitative type filter paper or the Fisher brand qualitative "coarse" type filter paper. In practice, one can use a single sheet of such filter paper or two sheets stacked one on the other.

In practicing the invention, it will be noticed by reference to equation (1) described above that for a given evaporation rate (R) the velocity v of the motion of the interface 19 is determined by the ratio of the capillary tube area a and the filter paper area A. Thus, for the use of the invention in an ambient which is quite dry, a filter paper with a smaller area a might be desirable. Furthermore, for environments that are rather humid, a larger area A of the filter paper may be desirable. However, there is an upper limit in the area (A) that one can use, determined by the capillary flow of water laterally from the capillary passageway 16 to the extremities of the filter paper. In practice, it should be understood that the flow of water from the capillary passageway 16 of the apparatus to the extremities of the filter paper 13 must be sufficient to maintain the entire surface of the filter paper wet.

The structural portion of the described evaporimeter can be made of materials other than glass or quartz. Such other materials may be metal or plastic. Furthermore, the invention as described provides for visually, automatically determining the evaporation rate (R). It will be appreciated by those skilled in the art that data of the evaporation rate (R) can be collected and stored or utilized on a real time basis by transmission to centralized locations.

Various modifications to the embodiment described hereinabove can be made in the practice of the invention. For example, it may be necessary to coat all of the capillary structure such as capillary passageway 16 and 22 not covered by the sensing head 42, with an opaque material to prevent ambient light level changes from affecting the level detectors. Moreover, an inorganic structure such as a glass fiber filter having similar capillary wicking behavior can be used in place of the standard filter paper 13. Such glass fiber filter may be preferable for extended operation because of its easily cleanable and durability features.

What is claimed is:

1. In an apparatus for automatically measuring the rate of evaporation of a liquid of the type having a capillary tube with a passageway having two open ends, said tube joined at one end to a plane having two parallel extensive surfaces such that the one end portion of the tube extends vertically upwardly through one of the plane surfaces and terminates at the other plane surface, the other open end of the tube being exposed to the ambient; an evaporation surface comprising a sheet of liquid saturable fibrous material attached to the other surface and extending sufficiently over the plane surface to cover the surface and the capillary tube end; whereby liquid saturating the sheet and extending through the passageway of the capillary tube will be drawn upwardly from the tube into the sheet as liquid evaporates from the sheet into the ambient air, the rate of upward movement of liquid in the tube passageway being an indicia of the evaporation rate of the liquid from the sheet, the improvement comprising:
   reservoir means for providing said liquid to said tube;
   means for replenishing said liquid automatically as it evaporates from said sheet; and
   means for determining the rate of evaporation of the liquid by sensing the movement of the liquid drawn upwardly through a predetermined portion of the tube as the liquid evaporates from the sheet;
   said replenishing means including means for maintaining continuous capillary action comprising a reservoir supply line for carrying said liquid to said capillary tube at a location in said tube above said predetermined portion to assure continuous capillary action in said tube.

2. In an apparatus according to claim 1, wherein said reservoir means includes a reservoir to hold a supply of said liquid, and conduit means comprising said reservoir supply line connected to said capillary tube to carry liquid from said reservoir to said tube.

3. In an apparatus according to claim 2, wherein said replenishing means includes:
   means for sensing the level of the liquid in said tube manifested by a liquid-air interface to provide a signal indicative of the passage of the liquid-air interface at a predetermined location;
   a valve in said conduit means to control the flow of liquid from the reservoir to the tube; and
   means responsive to said level signal to operate said valve to control the flow of liquid to said tube as the liquid evaporates therefrom.

4. In an apparatus according to claim 3, wherein said sensing means includes:
   one or more light emitting diodes (LED's) positioned in vertically spaced relation along said tube and arranged to pass light respectively through said tube passageway;
   one or more light detectors positioned along said tube to sense light from each respective LED;
   means coupled to said light detectors and responsive thereby to the amount of light passing through said tube as a function of the presence or absence of liquid in the tube to provide timing signals representing passage of the liquid-air interface respectively through the light of the two LED's; and
   means for applying said timing signals to said valve operating means to control the flow of liquid into said tube to a level below the bottommost light detector.

5. In an apparatus according to claim 4, further including means including said evaporation rate means responsive to said timing signals for calculating the evaporation rate and providing an output signal representing the evaporation rate.

6. In an apparatus according to claim 4, wherein each of said LED's is oriented at right angles to its associated light detector.

7. A method for automatically measuring the rate of evaporation of a liquid comprising the steps of:
   connecting a capillary tube of a liquid to a sheet of fibrous material;
   saturating the sheet with liquid;
   determining the rate of evaporation of the liquid by sensing the movement of the liquid drawn upwardly through a predetermined portion of the tube as the liquid evaporates from the sheet, and
   replenishing the liquid automatically as it evaporates from the sheet by connecting a replenishing liquid line to the capillary tube at a location in said tube above said predetermined location to assure continuous capillary action in said tube.

8. The method of claim 7, wherein said replenishing step comprises:
   connecting by a valve-controlled conduit comprising said replenishing liquid line a supply of liquid from a reservoir of such liquid to the capillary tube;
   controlling the valve to pass liquid to the capillary tube as the liquid is drawn from the tube.

9. The method of claim 7, wherein the liquid is water.

10. The method of claim 7, wherein the liquid is salt water.

11. The method of claim 7, wherein the liquid is distilled water.

12. The method of claim 7, wherein the sheet of fibrous material is filter paper.

13. The method of claim 7, wherein the sheet of fibrous material is formed of glass fibers.

* * * * *